United States Patent [19]

Dungner

[11] Patent Number: 5,791,146
[45] Date of Patent: Aug. 11, 1998

[54] ARRANGEMENT FOR RETURN OF EXHAUST GASES IN SUPERCHARGED ENGINES WITH TURBINES IN SERIES

[75] Inventor: Stefan Dungner, Södertälje, Sweden

[73] Assignee: Scania CV AB, Sweden

[21] Appl. No.: 849,491

[22] PCT Filed: Dec. 6, 1995

[86] PCT No.: PCT/SE95/01460

§ 371 Date: Jun. 5, 1997

§ 102(e) Date: Jun. 5, 1997

[87] PCT Pub. No.: WO96/18030

PCT Pub. Date: Jun. 13, 1996

[30] Foreign Application Priority Data

Dec. 8, 1994 [SE] Sweden ................. 9404258

[51] Int. Cl.⁶ ............................................ F02M 25/07
[52] U.S. Cl. ............................................ 60/605.2
[58] Field of Search ............................................ 60/605.2

[56] References Cited

U.S. PATENT DOCUMENTS 4,231,225  11/1980  Aya .
4,250,711  2/1981   Zehnder .
4,756,285  7/1988   Pischinger .

FOREIGN PATENT DOCUMENTS 0596855  5/1994   European Pat. Off. .
0599729  6/1994   European Pat. Off. .
4231218  9/1993   Germany .
4312462  10/1994  Germany ................. 60/605.2

OTHER PUBLICATIONS

Patent Abstracts of Japan, vol. 17, No. 604, M-1506, abstract of JP, A, 51-80089 (Hino Motors Ltd), 20 Jul. 1993.

*Primary Examiner*—Michael Koczo
*Attorney, Agent, or Firm*—Ostrolenk, Faber, Gerb & Soffen, LLP

[57] ABSTRACT

A supercharged EGR (Exhaust Gas Recirculation) turbine (6) is incorporated in the exhaust gas flow in series after the turbine (4) of the supercharger and is driven by the exhaust gases which have already passed through the turbine of the supercharger. The EGR turbine (6) is used for driving an EGR compressor (7) which delivers a partial gas flow which is to be returned to the inlet manifold (2) of the combustion engine. The partial gas flow intended for return to the inlet side is tapped from the exhaust manifold (3, 3') and is pressurized in the compressor stage (7). The EGR turbine (6) is controlled by a waste-gate valve (15) and the partial exhaust gas flow to the EGR compressor is controlled by a valve 17.

10 Claims, 1 Drawing Sheet

ARRANGEMENT FOR RETURN OF EXHAUST GASES IN SUPERCHARGED ENGINES WITH TURBINES IN SERIES

BACKGROUND OF THE INVENTION

The present invention relates to an arrangement for return of exhaust gases in combustion engines.

One method for reducing releases of nitrogen oxides, $NO_x$, is to return part of the exhaust gases to the engine before the next combustion. Part of the exhaust gases will remain in the combustion chamber after the scavenging stroke has been completed, i.e. after the exhaust valve has closed, and this feedback is called natural EGR (exhaust gas recirculation). This natural EGR is difficult to control in conventional engines without variable valve times.

In addition, a partial quantity of exhaust gases is usually returned via external EGR ducts to the inlet system of the combustion engine, thereby enabling feedback of exhaust gases to take place in a more controlled manner by means of control of an EGR valve. In certain operating situations, e.g. idling, no EGR is desired, since the engine may begin to misfire and possibly stop. On Otto engines, EGR systems have frequently come to be used for the purpose of reducing releases of nitrogen oxides, which primarily form at very high combustion temperatures.

In order to be able to return exhaust gases to the inlet side of the engine, it is necessary that the pressure on the exhaust gases be greater than the pressure on the inlet air on the inlet side of the engine. On supercharged combustion engines, particularly on supercharged diesel engines in which combustion takes place with air excess, however, the pressure on the inlet side is substantially greater than the exhaust pressure, which is obviously greatest at high engine speeds and high engine loads. This means that the pressure on the partial quantity of exhaust gases which is to be returned has first to be increased in order to make it possible for a flow of exhaust gases to be returned to the inlet side of the combustion engine even in extreme load situations.

On supercharged combustion engines it would be possible to achieve a developed flow of exhaust gases to the inlet side of the engine if the exhaust gases were returned to a point in the inlet system before the compressor stage, but this is not desirable in that the compressor would be fouled by the exhaust gases and its efficiency would also be reduced.

There are a multiplicity of different solutions for making it possible to return exhaust gases on supercharged combustion engines.

For example, U.S. Pat. No. 4,250,711 indicates a solution whereby exhaust gases are returned from the exhaust side to the inlet side after the compressor stage by means of the EGR duct connecting to the compressor diffuser entirely after the compressor blades. It also indicates that an extra compressor for the exhaust gas flow may be incorporated in the EGR duct. The disadvantage involved is that this solution for a practical and economic application makes it impossible to incorporate an exhaust gas cooler after the compressor stage, since the exhaust gas cooler would be obstructed by the returned exhaust gases and reduce its efficiency.

U.S. Pat. No. 4,231,225 indicates another solution whereby when a partial flow of exhaust gases from the engine, in this case the exhaust gases from one bank of cylinders in a V-engine, has passed through a first exhaust turbine in a first supercharger unit, it is returned to a second compressor in a second supercharger unit. New clean combustion air is compressed in the compressor stage of the first supercharger unit and remaining exhaust gases from the other cylinders of the engine pass through the exhaust turbine of the second supercharger unit. In this case the recirculating exhaust gases pass first through a turbine, thereby reducing the pressure in the exhaust gases. In that system a fixed quantity of exhaust gases is thus recirculated to the inlet side of the engine whatever the operating conditions at the time, which is to the detriment of vehicle handling during, for example, idling, since very uneven engine running may occur. In that system the controllability of the EGR flow is very bad, since the exhaust gas flow is much greater than the corresponding flow on the inlet side. U.S. Pat. No. 4,756,285 indicates a third solution whereby the exhaust gas flow from the engine drives two parallel compressors, one of which compresses clean combustion air for the supply of a mixture of clean combustion air and precompressed fuel to a precombustion chamber, whereas the other compressor compresses a mixture of recirculating exhaust gases and clean combustion air in order to supply a mixture of clean combustion air, recirculating exhaust gases and precompressed fuel to a main combustion chamber. In this case the recirculating exhaust gases are taken from an inlet downstream with respect to a turbine, as seen in the exhaust gas flow direction, where the exhaust gases have a lower pressure.

OBJECTS OF THE INVENTION

One object of the invention is to make it possible to return exhaust gases to the inlet side of supercharged combustion engines whereby the flow of returned exhaust gases may be adjusted in a controllable manner and is also developed during operating situations (particularly during a combination of high speed and high load) in which the inlet pressure is substantially greater than the pressure on the exhaust gas side.

A further object is to make it possible to incorporate an exhaust gas cooler without risk of the latter becoming obstructed by deposits from returned exhaust gases.

Another object is to provide an EGR system which may be selectably connected when EGR is desired and which in other operating situations creates only a minimal load on the combustion engine.

Another object is, with respect to the relevant controllable quantity of EGR flow, to minimise and adapt the energy which is required (and hence to load the engine) in order to increase the pressure of the relevant EGR flow to the extent required for guaranteeing a developed EGR flow.

Another object is to provide an arrangement whereby the compressor delivering the EGR flow is only swept by exhaust gases, thereby making it possible to optimise this compressor for this type of flow, in the same way as turbines swept by exhaust gases are designed to tolerate high temperatures and to counteract deposits from particles entrained by exhaust gases, with a view to achieving a compressor with long service life. The recirculation of exhaust gases directly from the exhaust manifold (without their having first passed through a turbine and having lost pressure) and the use of a special compressor which enhances the EGR flow mean that this EGR compressor can be made relatively simple and long maintain its function, since the required increase in the exhaust gas pressure in the EGR compressor is relatively small.

SUMMARY OF THE INVENTION

The foregoing and other objects are achieved in accordance with the present invention by any arrangement for return of exhaust gases in a supercharged combustion engine which includes: an exhaust system with an exhaust manifold which receives exhaust gases from the cylinders of the combustion engine and leads the exhaust gases to a first supercharger turbine; an inlet system for supply of inlet air to the cylinders of the combustion engine, the inlet system having a first supercharger compressor which is driven by the first supercharger turbine to pressurize the inlet air in the inlet system; an exhaust gas return duct which has a first end connected to the exhaust system and a second end connected to the inlet system; a second supercharger turbine which is arranged in series with the first supercharger turbine and which is driven by the exhaust gases which have already passed through the first supercharger turbine; a second supercharger compressor which is arranged in the exhaust gas return duct and which is driven by the second supercharger turbine to deliver a partial exhaust gas flow through the exhaust gas return duct at a pressure increased by the second supercharger compressor; a control valve arranged in the exhaust gas return duct to control the partial flow of the exhaust gases to be delivered by the second supercharger compressor; a bypass duct arranged in parallel with the second supercharger turbine; and a waste-gate valve arranged in the bypass duct to control the exhaust has flow which drives the second supercharger turbine by controlling the flow in the bypass duct. The arrangement according to the invention enables the proportion of exhaust gases returned to be controlled in a simple manner while at the same time the exhaust gases returned can be compressed to a greater pressure than the pressure prevailing on the inlet side even in very extreme load situations such as a combination of high speed and high load. Other features and advantages of the present invention will become apparent from the following description of the invention which refers to the accompanying drawings.

DETAILED DESCRIPTION OF THE PREFERRED EMBODIMENT(S)

Figure 1:
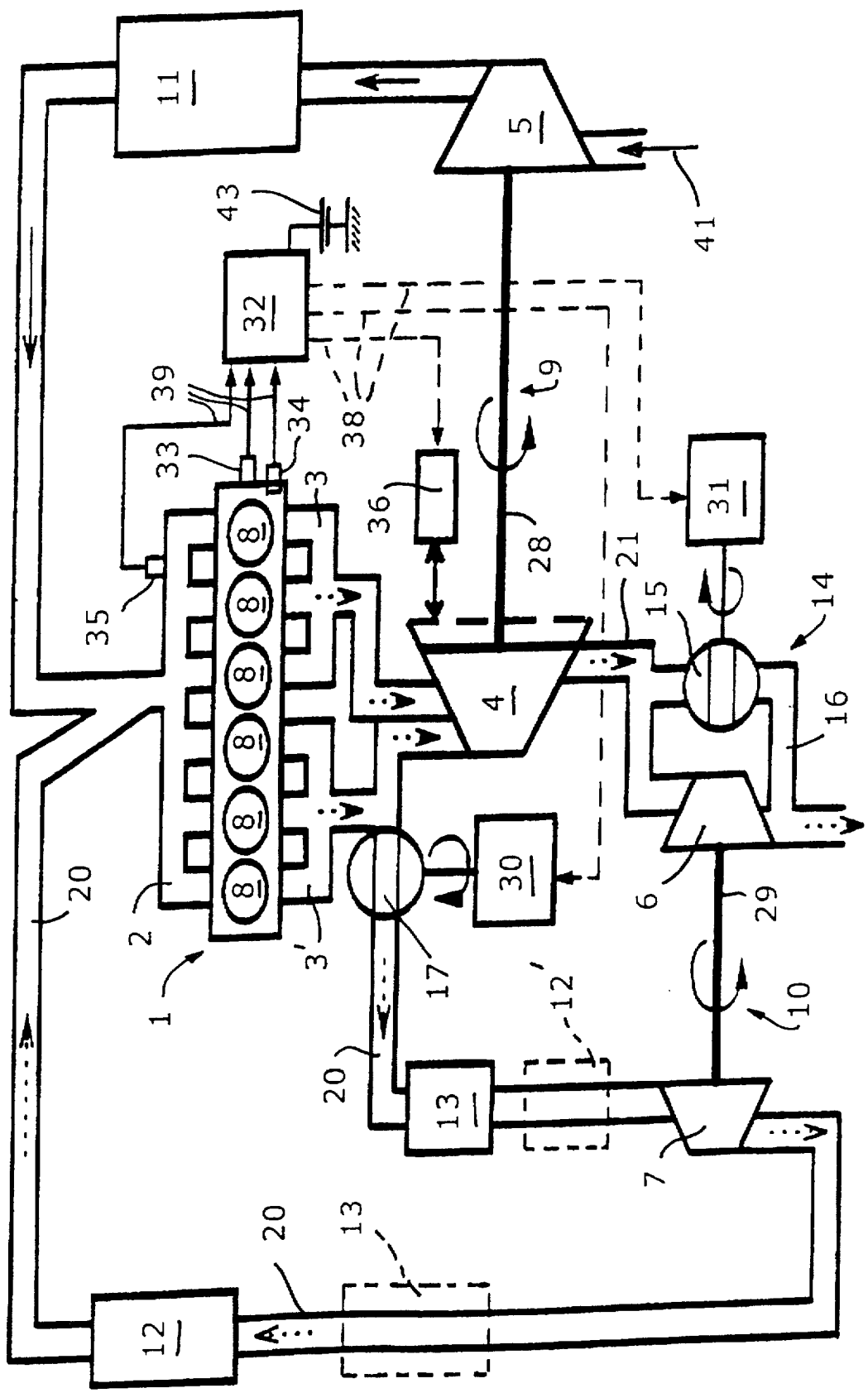
FIG. 1 is a schematic diagram of a supercharged combustion engine with a main supercharger unit and with a supercharger unit (connected in series on the exhaust gas flow) for the EGR flow.

FIG. 1 shows a supercharged combustion engine 1 which is preferably an engine in which combustion takes place with air excess and the fuel-air mixture self-ignites as a result of the compression heat developed. The invention is primarily applicable to diesel engines but may also be applied to other types of engines in which exhaust gas return is hindered by the inlet pressure being greater than the exhaust pressure in the operating situations in which exhaust gas return is desired.

By means of a supercharger unit 9 with a turbine (driven by exhaust gases and hereinafter called the supercharger turbine 4) and a compressor (driven by the turbine and hereinafter called the supercharger compressor 5) which are coupled for joint rotation on a common drive shaft 28, the pressure on the inlet air 41 may be increased to the inlet manifold 2 of the combustion engine in a conventional manner with a view to increasing the power output of the engine. In the diagram the inlet air flow is marked by unbroken flow arrows, whereas the exhaust gas flow is marked by discontinuous flow arrows. The exhaust gases from the combustion engine are gathered in an exhaust manifold 3,3' which in FIG. 1 is divided into two separate branches 3 and 3' respectively which connect to the inlet of the supercharger 4. The supercharger turbine 4 is provided in a conventional manner with a so-called divided inlet run so that exhaust pulses from one group of cylinders will not disrupt the scavenging of the cylinders in the other group. In this embodiment the exhaust manifold 3,3' is used to represent all the components such as branch pipes, pipelines and the like which form part of the engine exhaust system for leading exhaust gases from the cylinders 8 to the exhaust turbine 4. The exhaust manifold 3,3' has its first end communicating with the cylinders 8 of the combustion engine and receives exhaust gases from them, and has its second end communicating with the supercharger turbine 4 driven by the exhaust gases.

The first end of the inlet air manifold 2 of the combustion engine communicates with the supercharger compressor 5, which is driven by the supercharger turbine 4 and can thus pressurize the air in the inlet manifold 2, while the second end of the inlet air manifold 2 communicates with the cylinders 8 of the combustion engine in order to provide them with combustion air pressurised by the supercharger compressor 5.

An inlet air cooler 11 arranged in a conventional manner downstream from the supercharger compressor 5 cools the compressed and consequently heated air so that the power output from the combustion engine may be increased. The supercharger compressor 5 is supplied on its inlet side with filtered air 41 in a conventional manner.

In accordance with the invention there is also a second supercharger unit 10 (hereinafter called the EGR unit which includes a second supercharger turbine 6 and a second supercharge compressor 7) arranged in such a way that the EGR unit's turbine 6 (hereinafter called the EGR turbine) may receive the exhaust gases which have already passed through the turbine 4 of the first supercharger unit, i.e. a connection in series of the EGR turbine 6 to the outlet 21 of the supercharger unit. The EGR turbine 6 is coupled for joint rotation on a common shaft 29 the second supercharge compressor 7 (hereinafter called the EGR compressor) in order to drive the EGR compressor 7, which is intended to receive a partial exhaust gas flow from the exhaust manifold 3,3' of the combustion engine, which second partial exhaust gas flow may thus be pressurized for return to the inlet air manifold 2 of the combustion engine. When the exhaust gases have passed through the EGR turbine 6 or its bypass duct 16, they are led on further via the exhaust system of the combustion engine to a conventional silencer and any possible exhaust gas cleaning equipment (not depicted).

The EGR compressor 7 is arranged in an exhaust gas return duct 20 which has its first end connected to the exhaust manifold 3,3' and where the exhaust gas return duct 20 has its second end connected to the inlet air manifold 2.

The control of the EGR unit 10 is by means of two control valves 15,17 which respectively control the exhaust gas flow through the EGR turbine 6 and the partial exhaust gas flow which has to pass through the EGR compressor 7. The first control valve 15, which controls the exhaust gas flow through the EGR turbine 6, is a conventional control valve of waste-gate type which to a controllable extent can lead the exhaust gases past the EGR turbine 6. When this control valve 15 is fully closed, as schematically depicted in FIG. 1, all the exhaust gases are forced to pass through the EGR turbine 6, thereby driving the EGR compressor 7 with maximum possible power. When the control valve 15 is fully open, the exhaust gases will be led past the EGR turbine 6. The power extracted from the EGR compressor 7 is controlled by means of the control valve 15 which controls the flow of exhaust gases in the bypass duct 16. The control valve 15 is controlled by means of a control device 31 either by a degree of opening of the valve 15 which is proportional to the desired flow or by pulsewidth modulation whereby the valve 15 at a certain frequency moves between the fully open and fully closed positions and the degree of opening of the valve is determined by the time or pulsewidth when the valve is controlled towards the open position during the given control cycle.

The second artial exhaust gas flow which has to be led to the compressor 7 of the EGR unit is controlled by a control valve 17 which is connected to the exhaust manifold 3.3' of the combustion engine. FIG. 1 shows a divided exhaust manifold 3.3' which only brings the exhaust gas flows from the various groups of cylinders together in the turbine 4 of the first supercharger unit. The control valve 17 may preferably tap off the second partial exhaust gas flow 22 (which is intended for return to the inlet side) from one of these separated exhaust gas manifolds 3.3'. In combustion engines without these separated exhaust manifolds the respective partial exhaust gas flow which is intended to be returned to the inlet side is taken from a point in the exhaust gas manifold which receives exhaust gases from all the cylinders in the combustion engine. In other alternative embodiments the exhaust gases may be taken from any point whatsoever in the exhaust system, i.e. they may also be taken after the supercharger turbine 4, although thereby usually imposing substantial requirements for increasing the pressure of the returned gas flow. In alternative embodiments the returned gas flow may in principle be correspondingly led to any point whatsoever in the inlet system of the engine, although, as the description below indicates, certain points are more advantageous than others.

The partial exhaust gas flow to the EGR compressor 7 is controlled by the control valve 17, in a similar manner to control valve 15, by means of a control device 30 either by a degree of opening of the valve 17 which is proportional to the desired flow or by pulsewidth modulation whereby the valve 17 at a certain frequency moves between the fully open and fully closed positions and the degree of opening of the valve is determined by the time or pulsewidth when the valve is controlled towards the open position during the given control cycle.

FIG. 1 also shows various units for conditioning the exhaust gases returned to the inlet side. The partial exhaust gas flow intended for return to the inlet side of the combustion engine may possibly be conditioned by an exhaust gas cooler 12 arranged downstream from the EGR compressor 7 (as seen in the returned partial exhaust gas flow direction), between the EGR compressor 7 and the inlet manifold 2. This positioning means that the temperature increase imparted to the returned exhaust gases by the EGR compressor stage may be compensated by a corresponding reduction in the exhault gas cooler 12. Alternatively the exhault gas cooler may be placed before the EGR compressor stage 7 schematically depicted as 12'. The returned exhaust gases may also be conditioned by a catalyst 13 preferably arranged as close as possible to the exhaust gas manifold 3' for the sake of optimum efficiency. It is also possible, however, to place the catalyst after the EGR compressor stage 7 (as seen in the returned partial exhaust gas flow direction) at a position schematically depicted as 13' between the EGR compressor stage and the inlet manifold 2, before any possible charge air cooler 12 arranged after the compressor 7.

The control valves 15,17 are controlled via respective control devices 30.31 by a control unit 32, preferably a microcomputer-based control unit, which controls the control valves on the basis of detected engine parameters such as engine speed, engine temperature and charge air pressure, which are detected by the control unit by means of respective sensors 33,34,35 arranged on the engine. The control unit 32 receives signals representing the respective engine parameters via signal input lines 39 and controls the control devices by means of signals on the control lines 38 (depicted as "dotted" lines). The control unit 32 is powered by a battery 43.

For optimum control the turbine 4 of the first supercharger unit may be of variable geometry as depicted schematically by broken lines in FIG. 1. The control unit 32 may vary the geometry of the turbine 4 by means of a control device 36. The geometry of the turbine may thus be adapted to how the control valve 15 is controlled. When the control valve 15 is controlled so that the whole exhaust gas flow passes through the bypass duct 16, the turbine 4 of the supercharger unit has at the same time to be made larger so as to limit the charging pressure in the inlet manifold 2.

In an alternative embodiment (not depicted) the turbine 4 of the supercharger unit may be provided with a waste-gate control corresponding to the depicted control of the EGR turbine 6 in the EGR unit.

The units 12,13,12',13' which condition the returned partial exhaust gas flow take advantageously the form of small, simple and readily replaceable modules which may be changed at regular servicing intervals, possibly on the basis of the calculated or detected total cumulative EGR flow in the exhaust gas return duct 20. The ordinary inlet air cooler 11, which is larger and cools appreciably larger and continuous flows, thus does not risk being obstructed by soot particles from recirculating exhaust gases.

By means of the arrangement according to the invention a properly controllable flow of exhaust gas feedback (EGR) may be provided in all operating circumstances. The arrangement according to the invention may be modified in a multiplicity of ways with a view to increasing the controllability and safety of the system. For example, a speed monitor (or speed sensor) may be arranged on the EGR unit and may be used by the control unit 32 for controlling the control valves 15 and 17. The control valves 15 and 17 have to interactively close and open respectively in a synchronised manner so that the exhaust gas flow which drives the EGR turbine 6 matches the partial exhaust gas flow to be compressed in the EGR compressor 7, so that the EGR unit is not run at excessive speed. When EGR exhaust gas feedback is not desired and the control valve 15 is open and the control valve 17 is closed, the EGR unit will stop. With a view to better response, a certain flow may be continuously led through the turbine 6 of the EGR unit, so as to maintain the EGR unit at a certain standby speed. This standby speed may be controlled by a speed sensor at a speed level substantially lower than the normal operating speed of the EGR unit, so that when EGR flow starts there is no need to set a supercharger unit in motion from standstill, thereby enhancing response times and the life in particular of the bearings of the EGR unit.

In the embodiment depicted, the control valves 15,17 are controlled by electrical control devices but in other alternative embodiments these control devices may take the form of pressure-operated bellows tanks which in a self-regulating manner operate the control valves on the basis of inlet pressures and/or relative pressures between the EGR flow in the return duct 20 and the flow which drives the EGR turbine.

The number of sensors connected to the control unit 32 may be more than those shown in FIG. 1. For example, pressure or flow sensors may be arranged in the exhaust gas return duct 20 with a view to providing feedback information on the flow actually developed, and a pressure sensor may be arranged at the EGR turbine 6 with a view to controlling the waste-gate valve on a feedback basis.

The connection of the exhaust gas return duct 20 to the inlet air manifold 2 may also be designed so that a certain ejector effect is developed on the returned partial exhaust gas flow. For example, the exhaust gas return duct 20 may lead into a smaller pipe which is inserted in the inlet pipe and itself leads towards the cylinders, or alternatively the exhaust gas return duct 20 may lead into a nozzle, in which case the pressurised combustion air flowing past tends to entrain the returned partial exhaust gas flow which emerges from the exhaust gas return duct 20.

The EGR unit may preferably be a very small supercharging unit compared with the supercharging unit 4,5,28 and may correspond in size to a supercharging unit for considerably smaller engines. On a diesel engine, the size of the EGR unit may correspond to a conventional supercharging unit for an engine with a cylinder volume smaller by a factor of ten. Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. Arrangement for return of exhaust gases in a supercharged combustion engine, which arrangement comprises:
   a first supercharger turbine;
   an exhaust system with an exhaust manifold which receives exhaust gases from the cylinders of the combustion engine and leads the exhaust gases to the first supercharger turbine;
   an inlet system for supply of inlet air to the cylinders of the combustion engine, the inlet system having a first supercharger compressor which is driven by the first supercharger turbine to pressurize the inlet air in the inlet system;
   an exhaust gas return duct which has a first end connected to the exhaust system upstream, relative to the direction of flow of the exhaust gases, of the first supercharger turbine, and has a second end connected to the inlet system downstream, relative to the direction of flow of the inlet air, of the first supercharger compressor;
   a second supercharger turbine which is arranged in series with the first supercharger turbine and which is driven by the exhaust gases which have already passed through the first supercharger turbine;
   a second supercharger compressor which is arranged in the exhaust gas return duct and which is driven by the second supercharger turbine to deliver a partial exhaust gas flow through the exhaust gas return duct at a pressure increased by the second supercharger compressor;
   a control valve arranged in the exhaust gas return duct to control the partial flow of the exhaust gases to be delivered by the second supercharger compressor;
   a bypass duct arranged in parallel with the second supercharger turbine; and
   a waste-gate valve arranged in the bypass duct to control the exhaust gas flow which drives the second supercharger turbine by controlling the flow in the bypass duct.

2. Arrangement for return of exhaust gases in a supercharged combustion engine, which arrangement comprises:
   a first supercharger turbine, the first supercharger turbine is being of variable geometry;
   an exhaust system with an exhaust manifold which receives exhaust gases from the cylinders of the combustion engine and leads the exhaust gases to the first supercharger turbine;
   an inlet system for supply of inlet air to the cylinders of the combustion engine, the inlet system having a first supercharger compressor which is driven by the first supercharger turbine to pressurize the inlet air in the inlet system;
   an exhaust gas return duct which has a first end connected to the exhaust system and a second end connected to the inlet system;
   a second supercharger turbine which is arranged in series with the first supercharger turbine and which is driven by the exhaust gases which have already passed through the first supercharger turbine;
   a second supercharger compressor which is arranged in the exhaust gas return duct and which is driven by the second supercharger turbine to deliver a partial exhaust gas flow through the exhaust gas return duct at a pressure increased by the second supercharger compressor;
   a control valve arranged in the exhaust gas return duct to control the partial flow of the exhaust gases to be delivered by the second supercharger compressor;
   a bypass duct arranged in parallel with the second supercharger turbine; and
   waste-gate valve arranged in the bypass duct to control the exhaust gas flow which drives the second supercharger turbine by controlling the flow in the bypass duct.

3. Arrangement according to claim 2, wherein respective control devices are provided for controlling the control valve and the waste-gate valve.

4. Arrangement according to claim 3, wherein a control device is provided for controlling the geometry of the first supercharger turbine.

5. Arrangement according to claim 3, wherein a control unit is provided to control the respective control devices for the control valve and the waste-gate valve on the basis of respective engine parameters.

6. Arrangement according to claim 5, wherein sensors arranged on the combustion engine are provided to supply the control unit with signals representing the respective engine parameters.

7. Arrangement according to claim 4, wherein a control unit is provided to control the respective control devices for the control valve, the waste-gate valve and the geometry of the first turbine on the basis of respective engine parameters.

8. Arrangement according to claim 7, wherein sensors arranged on the combustion engine are provided to supply the control unit with signals representing the respective engine parameters.

9. Arrangement according to claim 6, wherein the control unit is microcomputer-based, the respective control devices are controlled electrically and the sensors provide the control unit with electrical input signals.

10. Arrangement according to claim 8, wherein the control unit is microcomputer-based, the respective control devices are controlled electrically and the sensors provide the control unit with electrical input signals.

* * * * *